(12) United States Patent
Kang

(10) Patent No.: US 7,030,350 B2
(45) Date of Patent: Apr. 18, 2006

(54) MICROWAVE OVEN EQUIPPED WITH TOASTER AND METHOD OF CONTROLLING THE SAME

(75) Inventor: Jeon-Hong Kang, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 10/397,240

(22) Filed: Mar. 27, 2003

(65) Prior Publication Data

US 2004/0094543 A1 May 20, 2004

(30) Foreign Application Priority Data

Nov. 15, 2002  (KR) ................. 10-2002-0071012

(51) Int. Cl.
*H05B 6/64* (2006.01)

(52) U.S. Cl. ...................... 219/885; 219/678

(58) Field of Classification Search .......... 219/685, 219/680, 538, 539–553; 99/325, 326, 327, 99/339, 385–403; 392/309, 310, 318
See application file for complete search history.

(56) References Cited

U.S. PATENT DOCUMENTS

| | | | |
|---|---|---|---|
| 2,844,089 A | 7/1958 | Lynch, Jr. | |
| 4,140,048 A | 2/1979 | Grove et al. | |
| 4,510,376 A | 4/1985 | Schneider | |
| 5,054,382 A | 10/1991 | Ward et al. | |
| 5,802,957 A * | 9/1998 | Wanat et al. | 99/327 |
| 6,013,908 A * | 1/2000 | Kume et al. | 219/719 |
| 6,218,652 B1 * | 4/2001 | Kim et al. | 219/721 |
| 6,539,840 B1 * | 4/2003 | Choi et al. | 99/331 |
| 6,610,970 B1 * | 8/2003 | Back | 219/685 |
| 6,621,058 B1 * | 9/2003 | Kim | 219/757 |

FOREIGN PATENT DOCUMENTS

| | | |
|---|---|---|
| BR | 9604760-7 A | 9/1998 |
| EP | 1 213 948 A3 | 6/2002 |
| KR | 2000-9620 | 2/2000 |
| KR | 2002-45200 | 6/2002 |

OTHER PUBLICATIONS

Patent Abstract of Japan for Japanese Publication No. 3271630, published Dec. 3, 1991.
Patent Abstract of Japan for Japanese Publication No. 4055622, published Feb. 24, 1992.

* cited by examiner

*Primary Examiner*—Daniel Robinson
(74) *Attorney, Agent, or Firm*—Staas & Halsey LLP

(57) ABSTRACT

A microwave oven equipped with a toaster and a method of controlling the same. Particularly, the microwave oven equipped with the toaster is provided with a plurality of heaters and a plurality of buttons each corresponding to one or more heaters to selectively operate the heaters provided in the toaster, thereby minimizing a power consumption resulting from an unnecessary operation of the heaters. Further, the microwave oven equipped with the toaster and the method of controlling the same limits a consumption current by preventing the toaster and the magnetron from simultaneously operating, thereby being applicable to, for example, the wall mounted microwave oven having a limited consumption current.

32 Claims, 5 Drawing Sheets

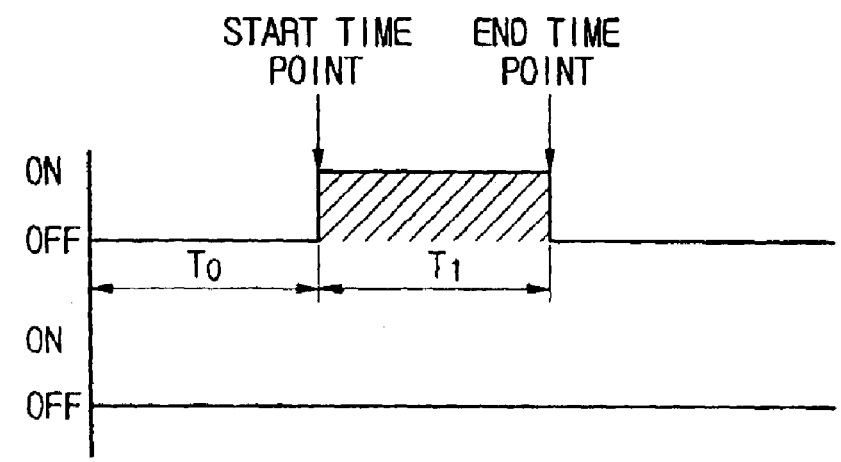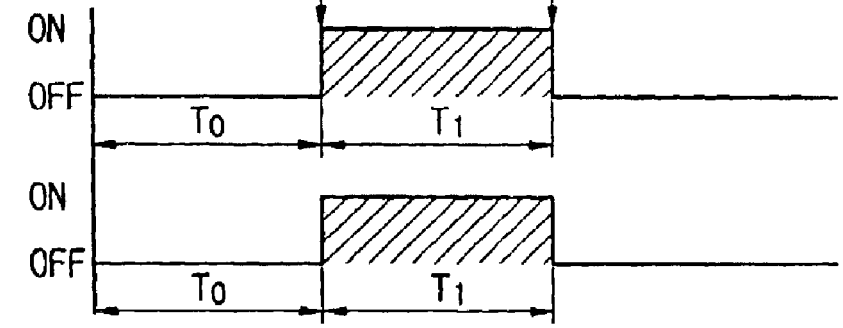

MICROWAVE OVEN EQUIPPED WITH TOASTER AND METHOD OF CONTROLLING THE SAME

CROSS-REFERENCE TO RELATED APPLICATIONS

This application claims the benefit of Korean Application No. 2002-71012, filed Nov. 15, 2002, in the Korean Intellectual Property Office, the disclosure of which is incorporated herein by reference.

BACKGROUND OF THE INVENTION

1. Field of the Invention

The present invention relates, in general, to a microwave oven equipped with a toaster and a method of controlling the same and, more particularly, to a microwave oven equipped with a toaster having a plurality of heaters and a method of controlling the same.

2. Description of the Related Art

In general, a microwave oven is an apparatus that cooks foods using microwaves provided to a cooking cavity from a magnetron.

Recently, a microwave oven in which a toaster that toasts bread is integrated has been developed.

The microwave oven equipped with the toaster is disclosed in detail in Korean Patent Unexamined Publication No. 2002-45200.

In the microwave oven equipped with the toaster, the toaster that toasts bread is integrated in a body of the microwave oven, and an operation button that controls the operation of the toaster is disposed in a control panel in which various buttons controlling various operations of the microwave oven are disposed.

The toaster is provided with two slot openings, which contain the bread to be toasted therein, in the body of the toaster formed in a rectangular shape. Further, the toaster is provided with heaters, which are electrically controlled and radiate heat to toast the bread contained in the two slot openings, at opposite sides of each of the two slot openings.

The toaster is operated by a drive circuit that allows power to be supplied to the heaters of the toaster when the operation button of the toaster is pressed. The drive circuit allows the power supplied to the heaters to be cut off before the operation button of the toaster is pressed, while the drive circuit allows the power to be supplied to the heaters when the operation button of the toaster is pressed.

However, in the conventional microwave oven equipped with the toaster, the power is supplied to all of the heaters when the operation button of the toaster is pressed. Accordingly, the heaters are not individually operated. Therefore, the conventional microwave oven is problematic in that a portion of the power is supplied to a heater that is not used to toast the bread and the portion of the power is undesirably consumed.

Further, the toaster and the magnetron are independently controlled in the conventional microwave oven. Accordingly, when the operation button of the toaster is pressed, the toaster is operated regardless of a cooking operation being provided by the magnetron, so a consumption current is increased. Therefore, if the toaster is disposed in a wall mounted microwave oven having a limited consumption current, a circuit breaker in a home may be operated by a flow of an excessive consumption current, which can cause, for example, a power failure.

SUMMARY OF THE INVENTION

Accordingly, it is an aspect of the present invention to provide a microwave oven equipped with a toaster and a method of controlling the same, which are capable of selectively operating heaters disposed in the toaster.

Another aspect is to provide a microwave oven equipped with a toaster, which is provided with operation buttons that selectively operate heaters disposed in the toaster.

A further aspect is to provide a wall mounted microwave oven equipped with a toaster and a method of controlling the same, in which a magnetron and heaters disposed in the toaster are prevented from being simultaneously operated.

Additional aspects and/or advantages of the invention will be set forth in part in the description which follows and, in part, will be obvious from the description, or may be learned by practice of the invention.

The above and/or other aspects of the present invention are achieved by providing a microwave oven equipped with a toaster including a plurality of slot openings that contain bread therein, a plurality of heaters that radiate heat to the bread contained in the slot openings, a plurality of switching units that control a power supply to the heaters, a key input unit that receives key commands to selectively operate the switching units, and a control unit that controls corresponding switching units in response to the key commands.

The above and/or other aspects of the present invention are achieved by providing a microwave oven equipped with a toaster including a plurality of slot openings for the toaster, a plurality of heaters that are adjacently disposed to the slot openings and heat the slot openings, a plurality of input keys that allow the heaters to be operated, a plurality of switching units that switches an electric connection of a power supply to the heaters to selectively operate the heaters, and a control unit that controls the switching units in response to input signals of the input keys.

The above and/or other aspects of the present invention are achieved by providing a method of controlling a microwave oven equipped with a toaster including determining whether a key command that allows the toaster to be operated is inputted, determining whether a magnetron is in operation if the key command is inputted, delaying an operation of the toaster if the magnetron is in operation, and operating the toaster if the magnetron is not in operation.

BRIEF DESCRIPTION OF THE DRAWINGS

These and/or other aspects and advantages of the invention will become apparent and more readily appreciated from the following description of the preferred embodiment, taken in conjunction with the accompanying drawings of which:

FIGS. 4A to 4D are timing charts illustrating driving states of first and second relay switches RY1 and RY2 when first and second buttons shown in FIG. 3 are pressed.

DETAILED DESCRIPTION OF THE PREFERRED EMBODIMENT

Figure 1:
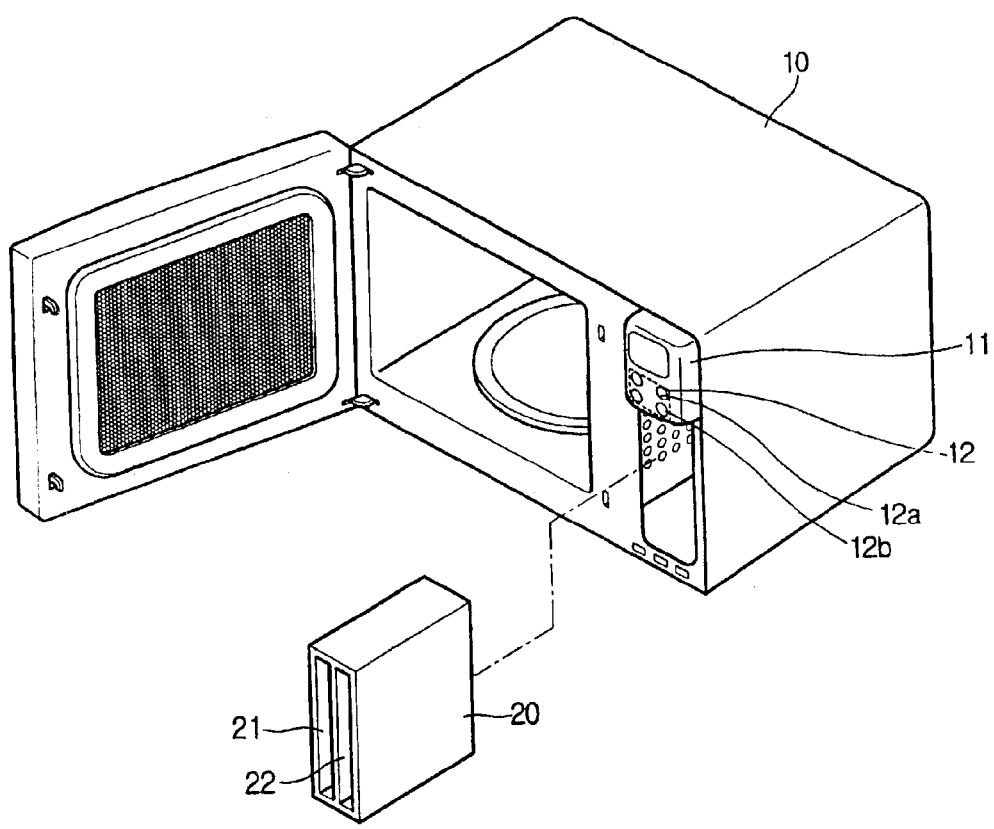
FIG. 1 is a perspective view of a microwave oven equipped with a toaster in accordance with an embodiment of the present invention.

Reference will now be made in detail to the present preferred embodiment of the present invention, examples of which are illustrated in the accompanying drawings, wherein like reference numerals refer to like elements throughout. The embodiment is described below in order to explain the present invention by referring to the figures.

FIG. 1 is a perspective view of a microwave oven equipped with a toaster in accordance with an embodiment of the present invention.

As shown in FIG. 1, in front of a machine room provided in one portion of the microwave oven, a toaster 20 that toasts bread is integrated in a body 10 of the microwave oven, and a key input unit 12 that receives key commands is disposed in a control panel 11 in which various buttons controlling various operations of the microwave oven are provided.

The toaster 20 is provided with a first slot opening 21 and a second slot opening 22, which receive the bread to be toasted therein, the first and second slot openings 21 and 22 being provided in a body of the toaster 20 and formed in a rectangular shape. Further, the toaster 20 is provided with first, second and third heaters 23, 24 and 25, as shown in FIG. 2, which are electrically controlled and radiate heat to toast the bread contained in the first slot opening 21 and the second slot opening 22, at opposite sides of each of the first slot opening 21 and the second slot opening 22.

The key input unit 12 includes a first button 12a and a second button 12b as operation buttons of the toaster 20. The first button 12a is used to operate the first and second heaters 23 and 24 when the bread is contained in the first slot opening 21, and the second button 12b is used to operate the first, second and third heaters 23, 24 and 25 when the bread is contained in the first slot opening 21 and the second slot opening 22, respectively (see FIG. 2).

Figure 2:
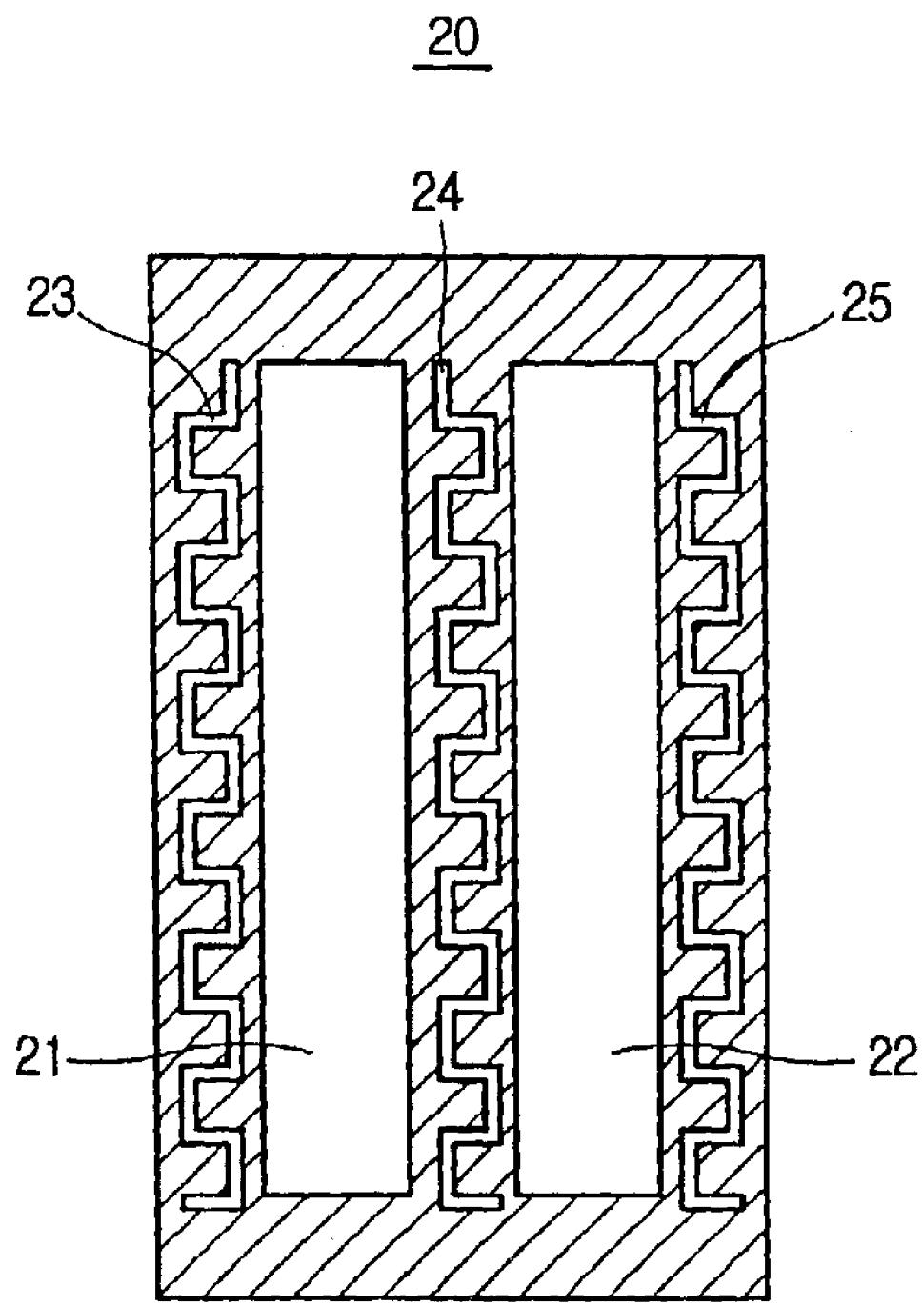
FIG. 2 is a schematic sectional view of the toaster shown in FIG. 1.

FIG. 2 is a schematic sectional view of the toaster shown in FIG. 1.

Referring to FIG. 2, the first slot opening 21 and the second slot opening 22 are provided in parallel. The first heater 23 is disposed at an outer side of the first slot opening 21. Further, the second heater 24 is disposed between the first slot opening 21 and the second slot opening 22. Accordingly, the bread contained in the first slot opening 21 is toasted by receiving heat at opposite sides of the first slot opening 21 from the first and second heaters 23 and 24. Further, the third heater 25 is disposed at an outer side of the second slot opening 22. Accordingly, the bread contained in the second slot opening 22 is toasted by receiving heat at opposite sides of the second slot opening 22 from the second and third heaters 24 and 25.

Hereinafter, there is described a drive circuit of the microwave oven that is integrated with the toaster having the first and second slot openings with reference to FIG. 1 and FIG. 2.

Figure 3:
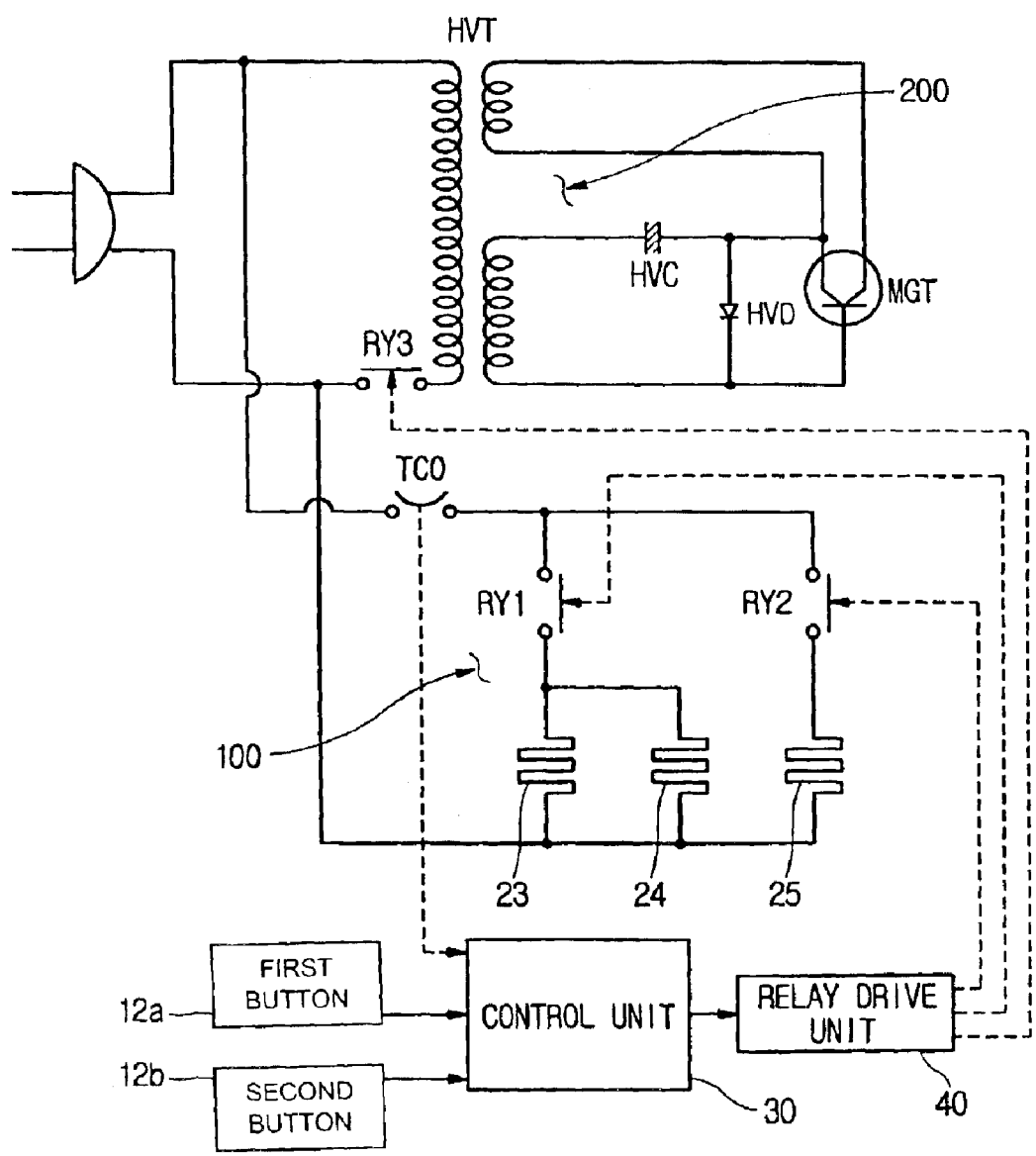
FIG. 3 is a drive circuit of the microwave oven equipped with the toaster having first and second slot openings in accordance with the embodiment of the present invention.

FIG. 3 is the drive circuit of the microwave oven equipped with the toaster having the first and second slot openings in accordance with the embodiment of the present invention.

As shown in FIG. 3, a toaster drive circuit 100 is included in a drive circuit of the microwave oven equipped with the toaster 20 having the first and second slot openings 21 and 22 in accordance with the embodiment of the present invention. The toaster drive circuit 100 is provided with a thermal cut-out TCO to prevent the overheating of the toaster. First terminals of a first relay switch RY1 and of a second relay switch RY2, which are connected to each other in parallel, are connected to one terminal of the thermal cut-out TCO. The first heater 23 and the second heater 24, which are connected to each other in parallel, are connected to a second terminal of the first relay switch RY1. Further, the third heater 25 is connected to a second terminal of the second relay switch RY2.

The first and second relay switches RY1 and RY2 are turned on or off by a relay drive unit 40, which is operated in response to control signals of a control unit 30 that controls an overall operation of the microwave oven. In this case, the control unit 30 drives the relay drive unit 40 by generating corresponding control signals in response to key commands that correspond to inputs of the first button 12a and the second button 12b.

Further, a high voltage unit control circuit 200 of the microwave oven that drives a magnetron MGT is included in the drive circuit of the microwave oven equipped with the toaster 20 having the first and second slot openings 21 and 22. The high voltage unit control circuit 200 of the microwave oven includes the magnetron MGT that oscillates at a high frequency, a high voltage transformer HVT that boosts a voltage of an input alternating current power supply and outputs the boosted voltage to the magnetron MGT, and a high voltage condenser HVC and a high voltage diode HVD that convert the boosted voltage outputted from the high voltage transformer HVT into a direct current DC of a high voltage. A third relay switch RY3 is connected between an external power supply and one terminal of the primary coil of the high voltage transformer HVT to operate the magnetron MGT. The high voltage unit control circuit 200 of the microwave oven that controls a high voltage unit and the toaster drive circuit 100 that drives the toaster 20 integrated in the microwave oven are connected to each other in parallel.

FIGS. 4A to 4D are timing charts illustrating driving states of the first and second relay switches RY1 and RY2 when the first button 12a and the second button 12b shown in FIG. 3 are pressed.

Referring to FIGS. 4A to 4D, when the first button 12a of the key input unit 12 is pressed, the control unit 30 controls the relay drive unit 40 to turn on the first relay switch RY1 for a predetermined period T1 so that power is supplied to the first and second heaters 23 and 24, and allows the bread contained in the first slot opening 21 to be toasted for the predetermined period T1.

When the second button 12b is pressed, the control unit 30 controls the relay drive unit 40 to turn on the first and second relay switches RY1 and RY2 so that the power is supplied to the first, second and third heaters 23, 24 and 25 for the predetermined period T1, and allows the bread contained in the first slot opening 21 and the second slot opening 22 to be toasted for the predetermined period T1.

Hereinafter, in the case where a wall mounted microwave oven having a limited consumption current is integrated with the toaster 20, a method is described of preventing a simultaneous operation of the toaster 20 and the magnetron MGT of the wall mounted microwave oven.

Figure 5:
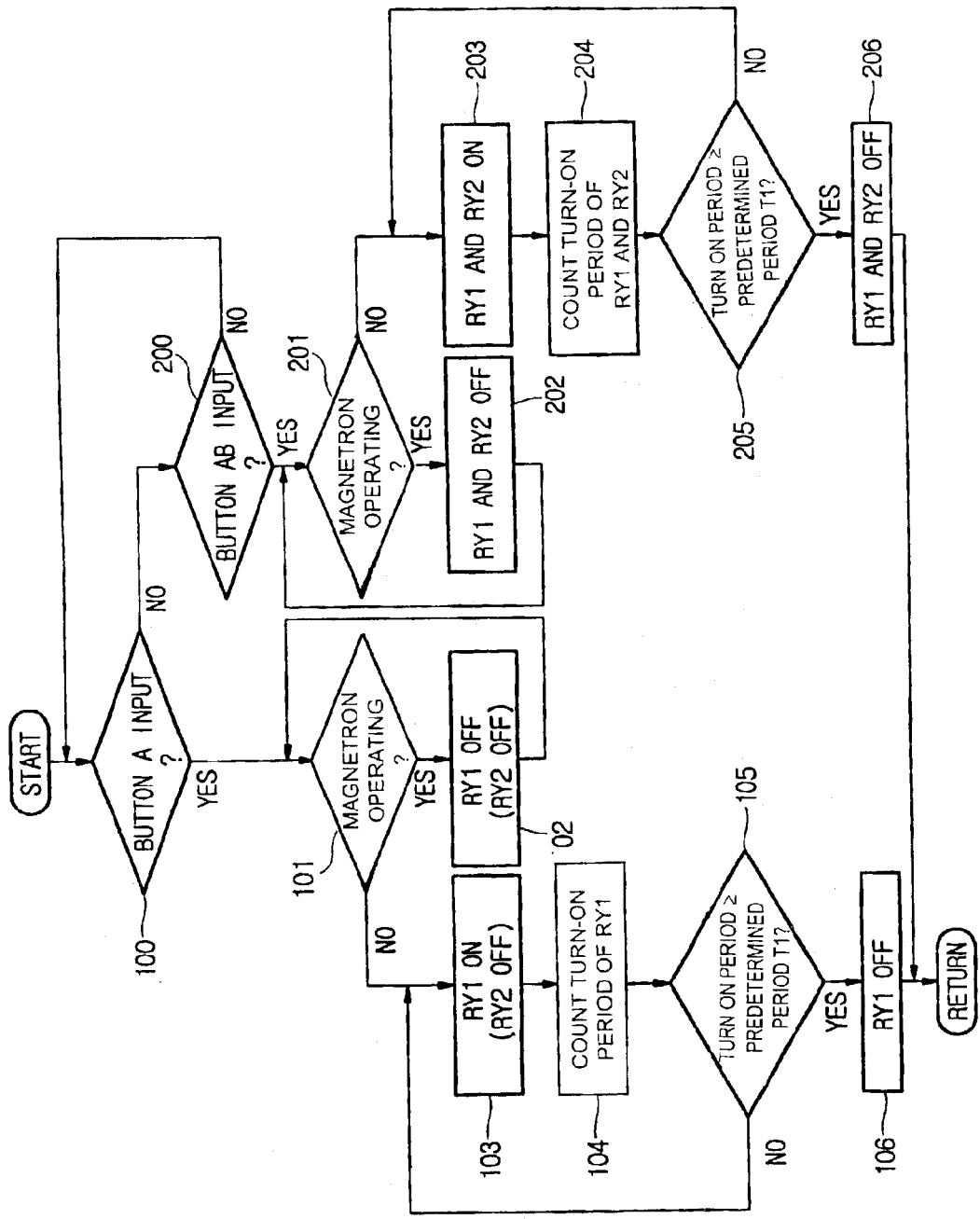
FIG. 5 is a control flowchart of the drive circuit of the microwave oven shown in FIG. 3.

FIG. 5 is a control flowchart of a drive circuit of the microwave oven shown in FIG. 3.

Referring to FIG. 5, the control unit 30 determines whether the first button 12a is pressed to confirm whether a key command corresponding to an input of the first button 12a exists at operation 100.

If the first button 12a is pressed at operation 100, the control unit 30 determines whether the magnetron MGT is operating to confirm whether a cooking operation is performed at operation 101. If the magnetron MGT is operating at operation 101 so that the cooking operation is performed, the control unit 30 controls the first relay switch RY1 to be turned off at operation 102 and returns to operation 101. Since the first relay switch RY1 is turned off, a power supply to the first and second heaters 23 and 24 is cut off for a designated period T0 when the magnetron MGT is operating, so that the magnetron MGT and the toaster 20 are not simultaneously operated. If the magnetron MGT is not operating at operation 101, the control unit 30 controls the first relay switch RY1 to be turned on at operation 103. Since the first relay switch RY1 is turned on, the power is supplied to the first and second heaters 23 and 24, so that the toaster 20 is operated.

The control unit 30 counts a turn-on period of the first relay switch RY1 at operation 104.

Thereafter, the control unit 30 compares the counted turn-on period with the predetermined period T1 and determines whether the counted turn-on period is longer than the predetermined period T1 at operation 105. If the counted turn-on period is shorter than the predetermined period T1 at operation 105, the process returns to operation 103. If the counted turn-on period is equal to or longer than the predetermined period T1 at operation 105, the control unit 30 controls the first relay switch RY1 to be turned off so that the operation of the toaster 20 is stopped at operation 106.

Further, if the first button 12a is not pressed at operation 100, the control unit 30 determines whether the second button 12b is pressed to confirm whether a key command corresponding to an input of the second button 12b exists at operation 200.

If the second button 12b is pressed at operation 200, the control unit 30 determines whether the magnetron MGT is operating to confirm whether a cooking operation is performed at operation 201. If the magnetron MGT is operating at operation 201 so that the cooking operation is performed, the control unit 30 controls the first and second relay switches RY1 and RY2 to be turned off at operation 202 and returns to operation 201. Since the first and second relay switches RY1 and RY2 are turned off, the power supply to the first, second and third heaters 23, 24 and 25 are cut off for the designated period T0 when the magnetron MGT is operating, so that the magnetron MGT and the toaster 20 are not simultaneously operated. If the magnetron MGT is not operating at operation 201, the control unit 30 controls the first and second relay switches RY1 and RY2 to be turned on at operation 203. Since the first and second relay switches RY1 and RY2 are turned on, the power is supplied to the first, second and third heater 23, 24 and 25, so that the toaster 20 is operated.

The control unit 30 counts a turn-on period of the first and second relay switches RY1 and RY2 at operation 204.

Thereafter, the control unit 30 compares the counted turn-on period with the predetermined period T1 and determines whether the counted turn-on period is longer than the predetermined period T1 at operation 205. If the counted turn-on period is shorter than the predetermined period T1 at operation 205, the process returns to operation 203. If the counted turn-on period is equal to or longer than the predetermined period T1 at operation 205, the control unit 30 controls the first and second relay switches RY1 and RY2 to be turned off so that the operation of the toaster 20 is stopped at operation 206.

As described above, when the toaster is integrated in the wall mounted microwave oven in which the microwave oven is current limited, the magnetron and the heaters are prevented from being simultaneously operated, so that the consumption current is limited. Accordingly, a power failure resulting from an operation of an earth leakage breaker, which is operated by an excessive consumption current generated from simultaneous operations of the magnetron and the heaters, is prevented.

As described above, the microwave oven equipped with the toaster and the method of controlling the same selectively operates the heaters provided in the toaster, thereby minimizing a power consumption caused by the undesired driving of the heaters.

Further, in the microwave oven equipped with the toaster and in the method of controlling the same, the magnetron is provided with a plurality of buttons that selectively operate the heaters provided in the toaster, thereby providing a convenience of a manipulation of the microwave oven to a user.

Further, the microwave oven equipped with the toaster and the method of controlling the same limits the consumption current of the microwave oven by preventing the toaster and the magnetron from being simultaneously operated, thus being applicable to, for example, wall mounted microwave ovens in which the consumption current is limited.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A microwave oven equipped with a toaster, comprising:
    a plurality of slot openings of the toaster that contain bread therein;
    a plurality of heaters that radiate heat to the bread contained in the corresponding slot openings;
    a plurality of switching units that control a power supply to corresponding ones of the heaters;
    a key input unit that receives key commands to selectively operate the switching units;
    a magnetron; and
    a control unit that controls corresponding switching units in response to the key commands and controls an operation of the magnetron and the plurality of heaters so as to prevent concurrent operation of the magnetron and the plurality of heaters.

2. The microwave oven as set forth in claim 1, wherein the key input unit is provided with a plurality of buttons.

3. The microwave oven as set forth in claim 2, wherein the microwave oven is a wall mounted microwave oven.

4. The microwave oven as set forth in claim 3, wherein the plurality of switching units are relay switches that switch the power supply to one or more of the heaters corresponding to each of the slot openings.

5. A method of controlling a microwave oven provided with a toaster, comprising:
    determining whether a key command that allows the toaster to be operated is inputted;
    determining whether a magnetron is operating when the key command is inputted;
    delaying an operation of the toaster when the magnetron is operating; and
    operating the toaster when the magnetron is not operating and the key command is determined to have been input.

6. The method as set forth in claim 5, wherein said microwave oven is a wall mounted microwave oven.

7. A microwave oven provided with a toaster, comprising:
    a plurality of slot openings for the toaster;
    a plurality of heaters that are disposed adjacent to corresponding slot openings and heat the corresponding slot openings;

a plurality of input keys that allow the heaters to be operated;

a plurality of switching units that switches an electric connection of a power supply to corresponding ones of the heaters to selectively operate the corresponding heaters;

a magnetron; and a control unit that controls the switching units in response to input signals of the input keys and controls an operation of the magnetron and the plurality of heaters so as to prevent concurrent operation of the magnetron and the plurality of heaters.

8. A microwave oven having a toaster to toast food, comprising:

an input unit;

two or more slots to toast the food therein;

one or more heaters to heat the food provided in corresponding ones of the slots;

a magnetron;

a switching unit to control the one or more heaters to heat the food in a selected slot based on instructions received by the input unit; and a control unit to control an operation of the magnetron and the one or more heaters so as to prevent concurrent operation of the magnetron and the one or more heaters.

9. The microwave oven as set forth in claim 8, wherein the input unit is provided with a plurality of buttons.

10. The microwave oven as set forth in claim 8, wherein the microwave oven is a wall mounted microwave oven.

11. The microwave oven as set forth in claim 8, wherein the one or more heaters are positioned adjacent to opposite sides of each of the slots to simultaneously heat the food on opposites sides of the food.

12. The microwave oven as set forth in claim 9, wherein at least one of the plurality of buttons corresponds to heating one of the slots and another one of the plurality of buttons corresponds to heating all of the slots.

13. The microwave oven as set forth in claim 8, further comprising:

a thermal cut-out to stop a supply of power to the switching unit to prevent the overheating of the toaster.

14. The microwave oven as set forth in claim 8, wherein the switching unit comprises:

one or more relay switches.

15. The microwave oven as set forth in claim 13, wherein the switching unit comprises:

one or more relay switches.

16. A microwave oven having a toaster to toast food, comprising:

an input unit;

two or more slots to toast the food therein;

one or more heaters to heat the food provided in corresponding ones of the slots; and a switching unit to control the one or more heaters to heat the food in one or more selected slots based on instructions received by the input unit, wherein the switching unit comprises:

one or more relay switches.

a thermal cut-out to stop a supply of power to the switching unit to prevent the overheating of the toaster, wherein:

the one or more relays comprise:

first and second relay switches, first terminals of the first relay switch and of the second relay switch, which are connected to each other in parallel, are connected to one terminal of the thermal cut-out, and the one or more heaters comprise:

first, second and third heaters, the first heater and the second heater, which are connected to each other in parallel, are connected to a second terminal of the first relay switch and the third heater is connected to a second terminal of the second relay switch.

17. The microwave oven as set forth in claim 14, wherein the one of more relay switches selectively switch a power supply to supply power to one or more of the heaters corresponding to one or more of the slots.

18. A method of controlling a microwave oven provided a toaster, comprising:

inputting an instruction to operate the toaster;

determining whether a magnetron is operating when the instruction is inputted;

delaying an operation of the toaster when the magnetron is operating; and operating the toaster when the magnetron is not operating so as to heat one slot of the toaster.

19. A method of controlling a microwave oven provided with a toaster having slots, comprising:

inputting an instruction to operate the toaster; and controlling one or more heaters to heat food in a selected slot based on the instruction and to prevent concurrent operation of a magnetron and the one or more heaters.

20. The method as set forth in claim 19, wherein:

the inputting of the instruction comprises:

manipulating one of a first button and a second button of a key input unit; and the controlling of one or more heaters comprises:

supplying power to first and second ones of the heaters to heat a first slot, if the first button is manipulated; and supplying power to the first heater, the second heater and a third ones of the heaters to heat the first slot and a second slot, if the second button is manipulated.

21. The method as set forth in claim 20, wherein the supplying of the power is for a predetermined period.

22. The method as set forth in claim 19, further comprising:

determining whether a magnetron is operating if the instruction is inputted;

delaying an operation of the toaster if the magnetron is operating; and operating the toaster if the magnetron is not operating.

23. The method as set forth in claim 22, wherein the operating of the toaster comprises:

counting a turn-on period of the toaster;

determining whether the counted turn-on period of the toaster is longer than a predetermined period; and turning-off the toaster if the counted turn-on period of the toaster is longer than the predetermined period.

24. The method as set forth in claim 19, further comprising:

preventing simultaneous operations of a magnetron and the one or more heaters.

25. The method as set forth in claim 19, wherein the microwave oven is a wall mounted microwave oven.

26. A microwave oven provided with a toaster, comprising:

two or more slots disposed in the toaster;

one or more heaters disposed adjacent to corresponding ones of the slots to heat the corresponding slots;

a plurality of input keys to selectively operate the heaters;

a plurality of switching units to connect or disconnect power to corresponding ones of the heaters to selectively operate the corresponding heaters;

a magnetron; and a control unit to control the switching units based on input signals of the input keys and to control an operation of the magnetron and the plurality of heaters so as to prevent concurrent operation of the magnetron and the heaters.

27. The microwave oven as set forth in claim 26, further comprising:

a magnetron to radiate microwaves, wherein the control unit controls the plurality of switching units and the magnetron such that one of the magnetron is stopped when the corresponding heaters are operating and of the corresponding heaters are stopped when the magnetron is operating.

28. A microwave oven having a toaster to toast food, comprising:

an input unit;

two or more slots of the toaster to toast the food therein;

one or more heaters to heat the food provided in corresponding ones of the slots;

a magnetron;

a switching unit to control the one or more heaters to heat the food in the slots based on instructions received by the input unit; and a control unit to control an operation of the magnetron and the plurality of heaters so as to prevent concurrent operation of the magnetron and the heaters.

29. A microwave oven having a toaster to toast food, comprising:

a plurality of slots of the toaster to toast the food therein;

a plurality of heaters to heat the food provided in corresponding ones of the slots;

a switching unit to switch a power supply to one or more of the plurality of heaters;

an input unit to receive instructions to selectively switch the switching unit;

a magnetron; and a control unit to control the switching unit according to the instructions received by the input unit and controls an operation of the magnetron and the plurality of heaters so as to prevent concurrent operation of the magnetron and the plurality of heaters.

30. A microwave oven having a toaster to toast food, comprising:

an input unit;

a plurality of slots of the toaster to toast the food therein;

first, second and third heaters to heat the food provided in corresponding ones of the slots;

a magnetron;

a switching unit to control the first, second and third heaters to selectively heat the food in selected slots based on instructions received by the input unit; and a control unit to control an operation of the magnetron and the heaters so as to prevent concurrent operation of the magnetron and the heaters.

31. A control unit for a microwave oven having a toaster including one or more heaters to toast food, comprising:

a switching unit to switch power supplied from a power supply to the one or more heaters;

an input unit to receive instructions to selectively switch the switching unit;

a magnetron; and a control unit to control the switching unit according to the instructions received by the input unit and to control an operation of the magnetron and the one or more heaters so as to prevent concurrent operation of the magnetron and the one or more heaters.

32. A control unit for a microwave oven having a toaster including two or more slots of the toaster to toast food therein and heaters corresponding thereto, comprising:

an input unit;

a switching unit to control the corresponding heaters to selectively heat the food in selected slots based on instructions received by the input unit; and a control section to control an operation of a magnetron and the heaters so as to prevent concurrent operation of the magnetron and the heaters.

* * * * *

UNITED STATES PATENT AND TRADEMARK OFFICE
CERTIFICATE OF CORRECTION

| | |
|---|---|
| PATENT NO. | : 7,030,350 B2 |
| APPLICATION NO. | : 10/397240 |
| DATED | : April 18, 2006 |
| INVENTOR(S) | : Jeon-Hong Kang |

It is certified that error appears in the above-identified patent and that said Letters Patent is hereby corrected as shown below:

Column 7, line 33, change "opposites" to --opposite--

Column 7, line 58, change "switches."" to --switches;--

Signed and Sealed this

Twenty-second Day of August, 2006

JON W. DUDAS
*Director of the United States Patent and Trademark Office*